United States Patent
Huang

(10) Patent No.: US 6,230,850 B1
(45) Date of Patent: May 15, 2001

(54) BRAKE CALIPER FOR A BICYCLE DISK BRAKE

(76) Inventor: Bill Huang, No. 5-15, Lun Ya Lane, Lun Ya Lee, Yuanlin Chen, Changhua Hsien (TW)

( * ) Notice: Subject to any disclaimer, the term of this patent is extended or adjusted under 35 U.S.C. 154(b) by 0 days.

(21) Appl. No.: 09/339,049

(22) Filed: Jun. 23, 1999

(51) Int. Cl.[7] ........................................ B62L 3/00
(52) U.S. Cl. ................................. 188/24.21; 188/24.12; 188/71.7; 188/72.9
(58) Field of Search ............................ 188/24.12, 24.21, 188/71.7, 72.6, 72.7, 72.9, 196 R

(56) References Cited

U.S. PATENT DOCUMENTS

| | | | |
|---|---|---|---|
| 1,978,974 | * 10/1934 | Williams | 188/71.7 |
| 3,795,290 | * 3/1974 | Hori et al. | 188/72.9 |
| 4,842,102 | * 6/1989 | Tateyama et al. | 188/24.21 |

* cited by examiner

Primary Examiner—Robert J. Oberleitner
Assistant Examiner—Mariano Sy
(74) Attorney, Agent, or Firm—Varndell & Varndell, PLLC

(57) ABSTRACT

In a brake caliper for a bicycle disk brake, a crank lever is driven to pull two cam shafts in achieving a braking operation, the crank lever having a substantially U-shaped head fastened to the brake cable of the bicycle, two arms respectively coupled to the two cam shafts, two shoulders respectively connected between the arms and two opposite ends of the U-shaped head, a screw hole and a recessed locating hole respectively provided at the shoulders, a screw rod threaded into the screw hole and having one end inserted into the recessed locating hole, and an adjustment nut threaded onto the screw rod and rotated to adjust the pitch between the shoulders of the crank lever.

2 Claims, 5 Drawing Sheets

BRAKE CALIPER FOR A BICYCLE DISK BRAKE

BACKGROUND AND SUMMARY OF THE INVENTION

The present invention relates to a disk brake for a bicycle, and more particularly to a brake caliper for a bicycle disk brake which can easily be adjusted to change the pitch between two arms of the crank lever thereof, so as to achieve a positive brake operation.

A regular bicycle may be equipped with a disk brake, and operated to stop the bicycle from movement. A conventional bicycle disk brake is generally comprised of a brake disk fixedly fastened to the hub at the front fork of the bicycle, and a brake caliper mounted on lugs at the front fork and driven by a brake line to stop the brake disk from rotation. The brake caliper, as shown in FIGS. 1, 2 and 3, comprises a brake caliper base having two receiving chambers at two opposite sides of the brake disk, two cam shafts respectively mounted in the receiving chambers inside the base, two brake linings respectively fastened to the cam shafts by screws, and a crank lever having a substatially U-shaped head connected to the brake cable and two arms respectively extended from the two opposite ends of the U-shaped haed and connected to the cam shafts outside the brake caliper base. This structure of brake caliper is functional, however it still has drawbacks. Because the crank lever is made by stamping a steel plate into shape, the spring power of the arms of the crank lever become worse after a long use. Because the pitch between the arms of the crank lever is not adjustable, the crank lever does not function well when the spring power of the arms become worse.

The present invention has been accomplished to provide a brake caliper for a bicycle disk brake which eliminates the aforesaid problem. It is the main object of the present invention to provide brake caliper for a bicycle disk brake, which can be conveniently adjusted to fit the spring power of the arms of the crank lever, enabling a brake action to be positively achieved. According to the present invention, an adjustment device is provided for adjusting the pitch between the arms of the crank lever, enabling the crank lever to be positively driven by the brake cable to achieve a brake action. The adjustment device comprises a screw rod threaded into a screw hole at one of the two shoulders of the crank lever and engaged into a recessed locating hole at the other of the two shoulders of the crank lever, and a nut threaded onto the screw rod and rotated to move the screw rod for changing the pitch between the shoulders (arms) of the crank lever.

DETAILED DESCRIPTION OF THE PREFERRED EMBODIMENT

Figure 1:
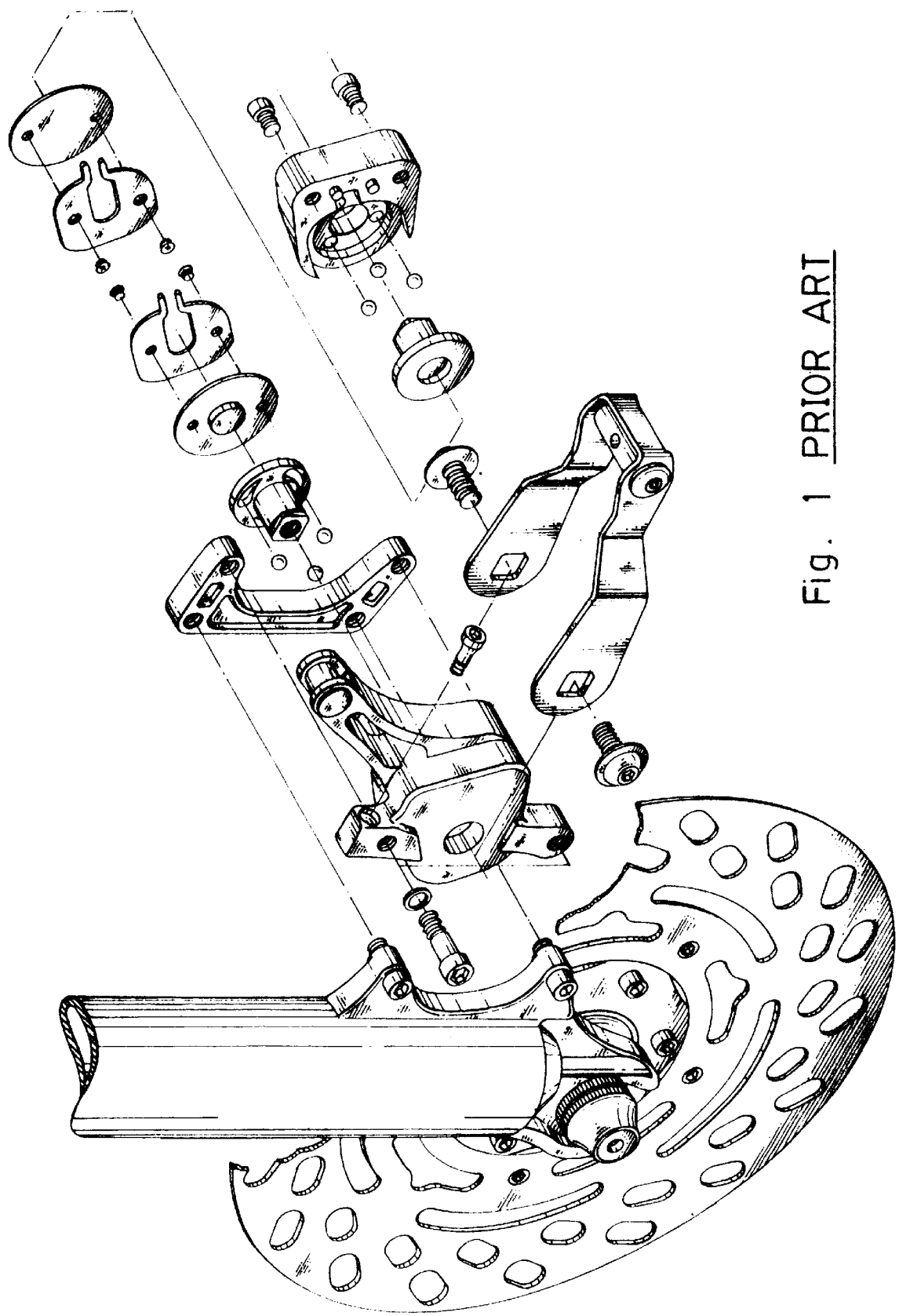
FIG. 1 is an exploded view of a brake caliper for a bicycle disk brake according to the prior art.
Figure 3:
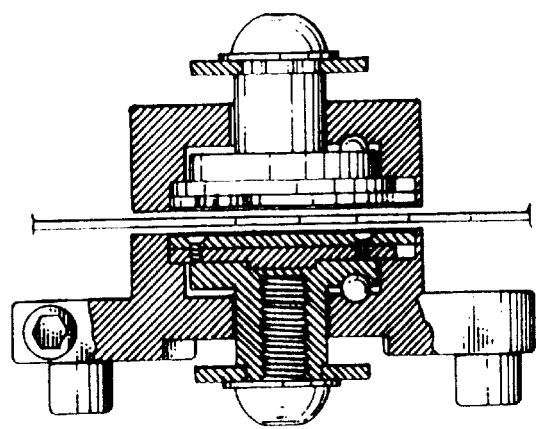
FIG. 3 is a sectional view taken along line 3—3 of FIG. 2.
Figure 2:
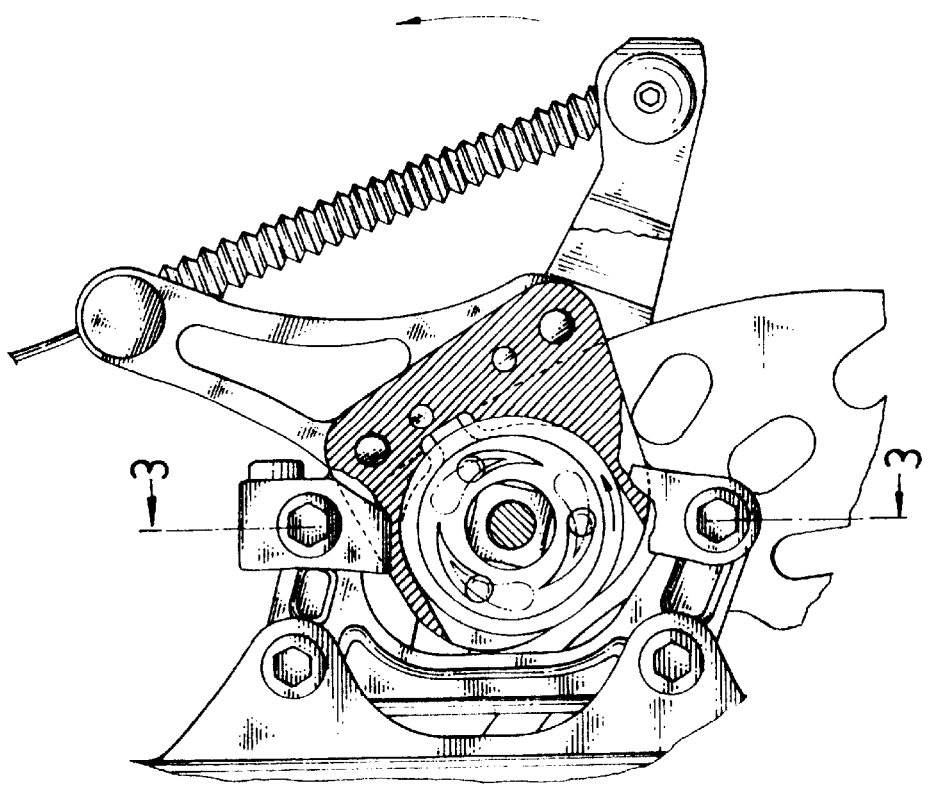
FIG. 2 illustrates the brake caliper of the bicycle disk brake of FIG. 1 operated.
Figure 4:
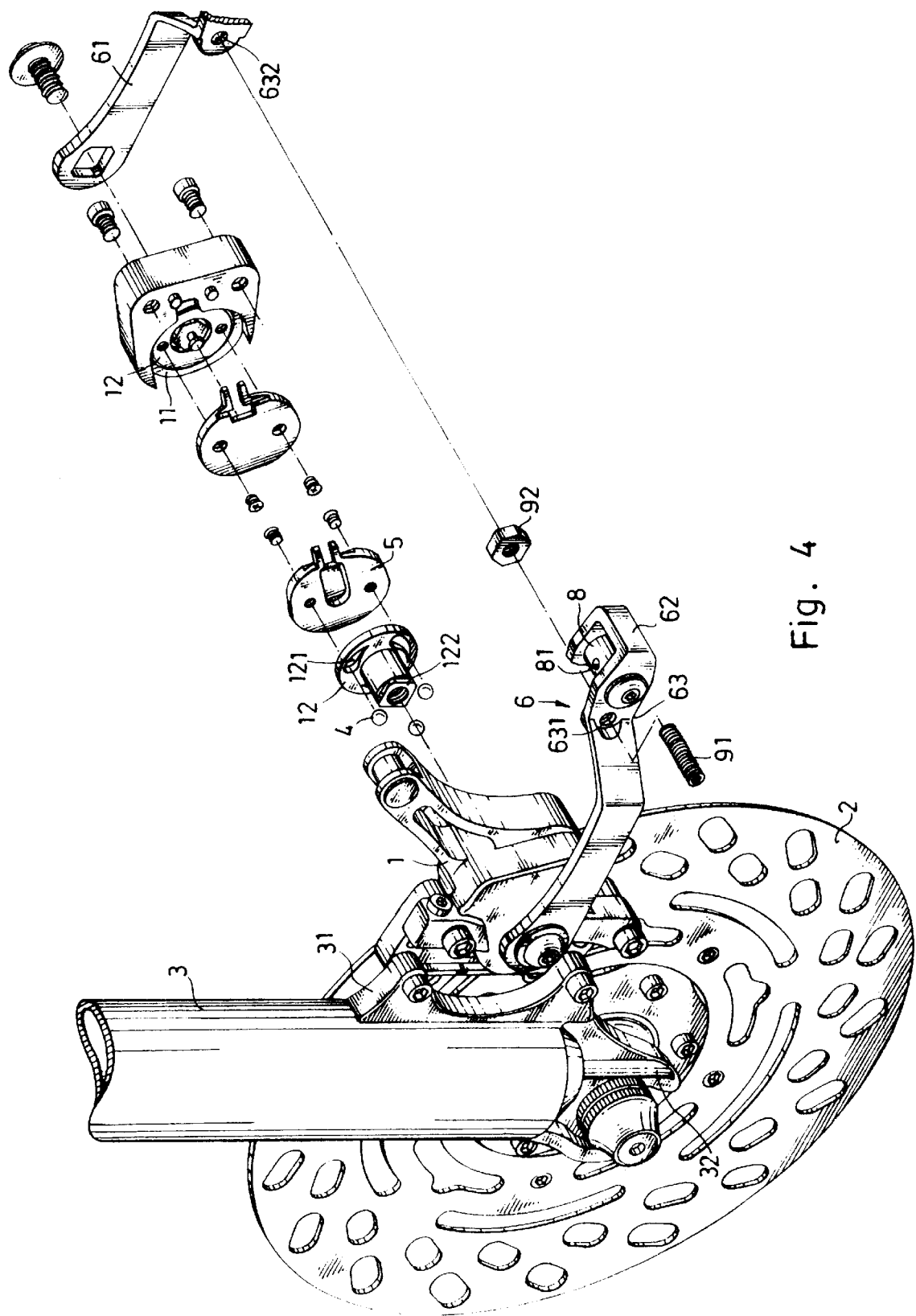
FIG. 4 is an exploded view of a brake caliper for a bicycle disk brake to the present invention.
Figure 5:
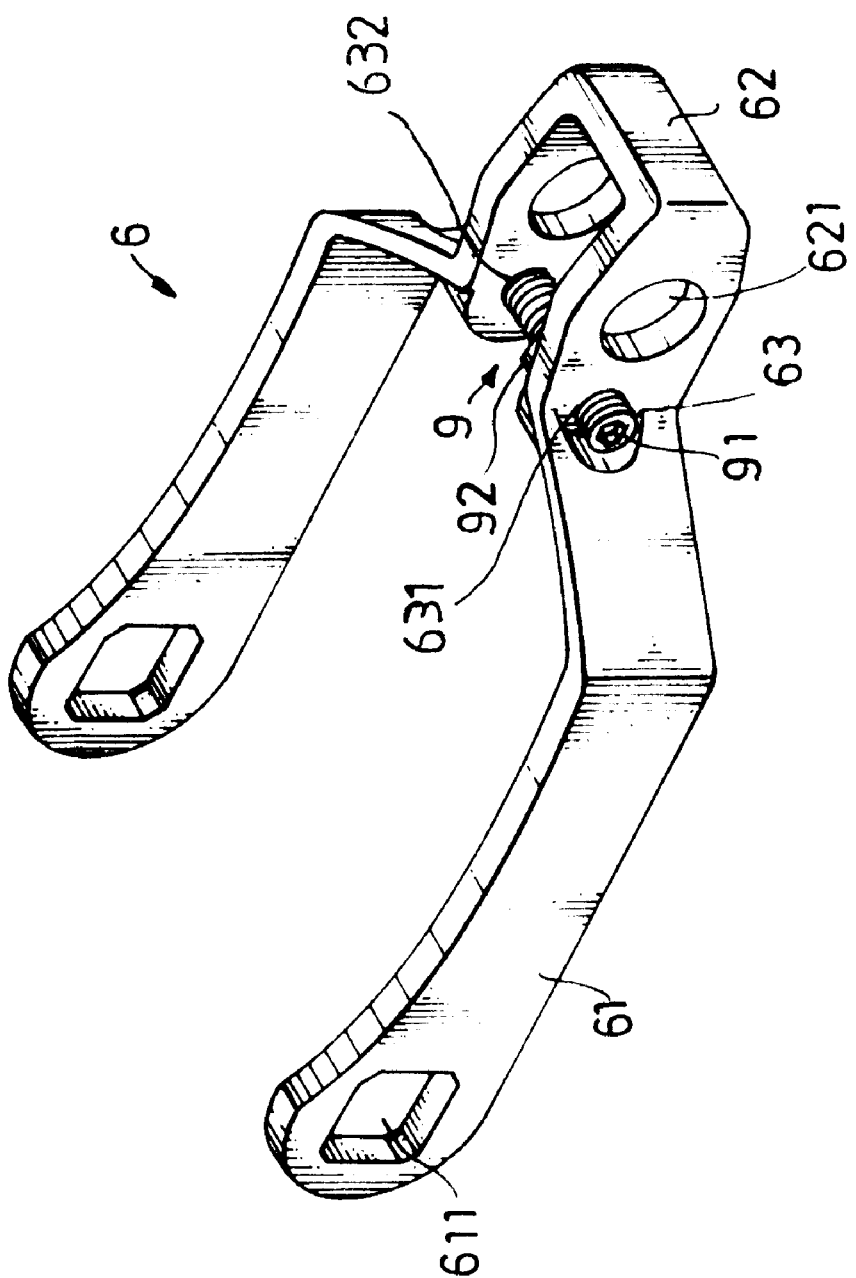
FIG. 5 is an elevational view of the crank lever of the brake caliper according to the present invention.
Figure 6:
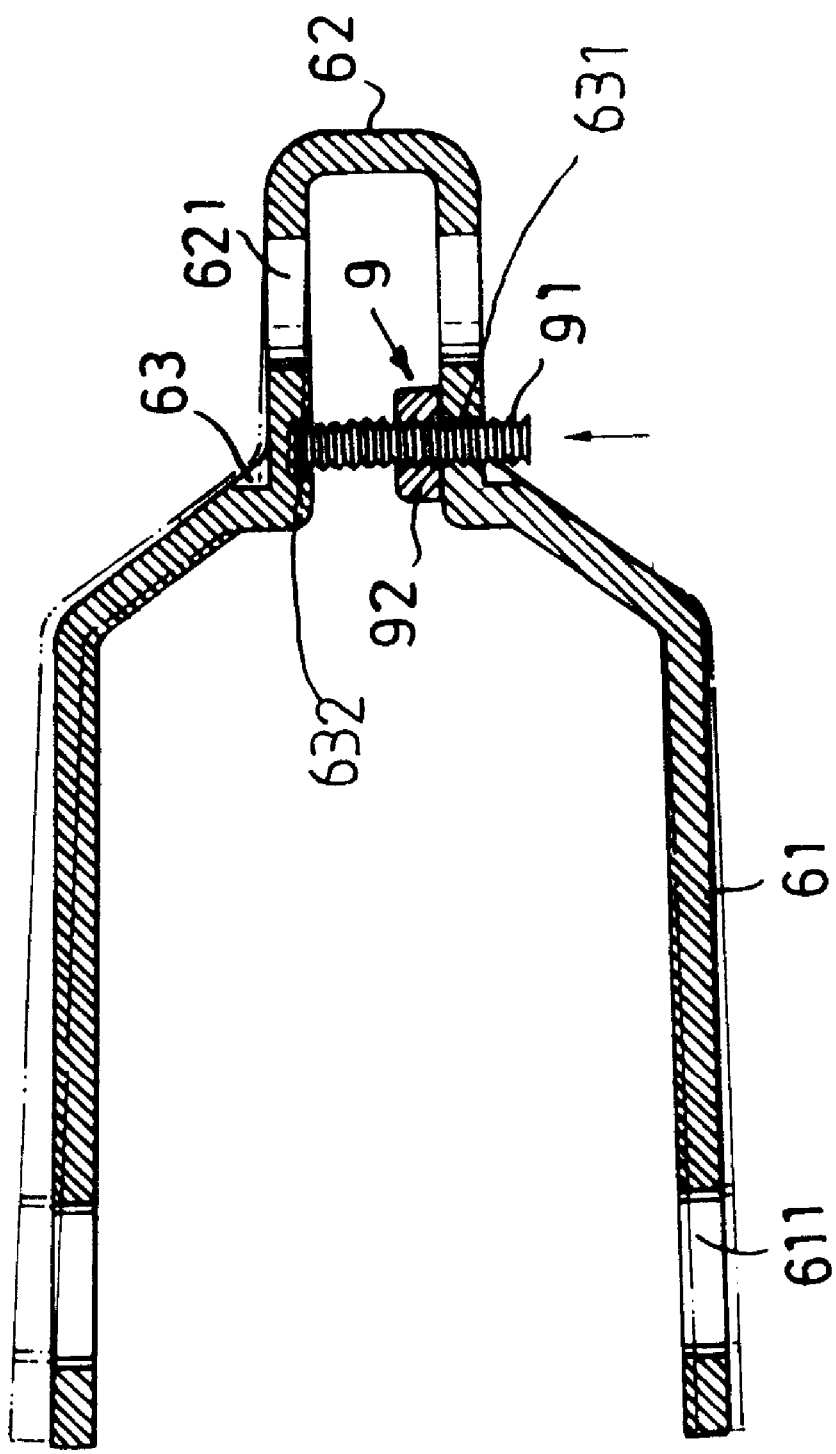
FIG. 6 is a sectional view showing the adjustment device adjusted, the pitch between the arms of the crank lever changed.

Referring to FIGS. from 4 through 6, a hollow brake caliper base 1 is fastened to lugs 31 at the front fork 3 of a bicycle (not shown), and suspended around the periphery of a brake disk 2, which is fastened to the wheel hub 32 of the bicycle. The brake caliper base 1 comprises two receiving chambers 11 spaced from two opposite sides of the brake disk 2. Two cam shafts 12 are respectively mounted in the receiving chambers 11 in the brake caliper base 1. The can shafts 12 each comprise a rectangular shaft body 122 respectively extended out of the brake caliper base 1, and a plurality of sloping recesses 121 spaced around the shaft body 122. Steel balls 4 are respectively mounted in the sloping recesses 121, and disposed in contact with the inside wall of the brake caliper base 1. Two brake linings 5 are respectively fastened to the brake caliper base 1 at one side, and respectively facing the two opposite side walls of the brake disk 2. A crank lever 6 is provided having a substantially U-shaped head 62 fastened to the brake cable (not shown), and two arms 61 respectively extended from the two opposite ends of the U-shaped head 62. The U-shaped head 62 has two axle holes 621 aligned at two opposite sides. A bolt 8 is mounted in the axle holes 621 at the U-shaped head 62, having a cable hole 81, which is fastened to the brake cable. The arms 61 each have a polygonal coupling hole 611 of each cam shaft 12 and secured in place by a respective hollow bolt.

The crank lever 6 further comprises two shoulders 63 connected between the two opposite ends of the U-shaped head 62 and the arms 61, a screw hole 631 through one of the shoulders 63, and a recessed locating hole 632 at the other of the shoulders 63 at an inner side in alignment with the screw hole 631. An adjustment device 9 is installed in the crank lever 6, and adjusted to limit the expanding range of the arms 61 of the crank lever 6. The adjustment device 9 comprises a screw rod 91 threaded into the screw hole 631 and engaged into the recessed locating hole 632, and an adjustment nut 92 threaded onto the screw rod 91 and stopped at one of the shoulders 63 at an inner side. By means of rotating the adjustment nut 92 to adjust the pitch between the shoulders 63, the expanding range of the arms 61 is relatively adjusted. When the spring power of the arms 61 of the crank lever 6 become worse, the adjustment nut 92 is rotated to expand the pitch between the shoulders 63, enabling the crank lever 6 to be Positively driven to pull the cam shafts 12.

What is claimed is:

1. A brake caliper installed in a disk brake of a bicycle and working with the brake disk of a disk brake for stopping the bicycle, the brake caliper comprising a brake caliper base fastened to lugs at a front fork of the bicycle, two cam shafts respectively mounted in the brake caliper base and spaced from the brake disk on opposite sides of the disk brake, the cam shafts having a rectangular shaft body respectively extending out of the brake caliper base, and a crank lever coupled to the cam shafts and driven by a brake cable of the disk brake to move the cam shafts relative to the brake disk, the crank lever having an integral structure terminating in a substantially U-shaped head, the U-shaped head being fastened to the brake cable of the bicycle and having legs respectively terminating in two shoulders, the two shoulders transversely extending and respectively joined to a first end of two parallel extending arms, second ends of the two parallel extending arms respectively coupled to the rectangular shaft body of the cam shafts, a screw hole and a recessed hole respectively provided on the legs of the U-shaped head where the shoulders join the legs of the U-shaped head, a screw rod threaded into the screw hole and having one end inserted into the recessed hole, and an adjustment nut threaded onto the screw rod and rotated to adjust a pitch between the shoulders thereby compensating for spring power of the two arms.

2. The brake caliper of claim 1, wherein the adjustment nut is mounted on the screw rod between the shoulders of the crank lever.

* * * * *